United States Patent [19]

Miura et al.

[11] Patent Number: 5,312,226
[45] Date of Patent: May 17, 1994

[54] TURBO COMPRESSOR AND METHOD OF CONTROLLING THE SAME

[75] Inventors: Haruo Miura; Kazuo Takeda, both of Ibaraki, Japan

[73] Assignee: Hitachi, Ltd., Tokyo, Japan

[21] Appl. No.: 959,090

[22] Filed: Oct. 9, 1992

[30] Foreign Application Priority Data

Oct. 14, 1991 [JP] Japan .................. 3-264513

[51] Int. Cl.$^5$ .................................... F01D 3/04
[52] U.S. Cl. ......................... 415/106; 415/107; 415/1; 415/14; 415/118; 310/90.5
[58] Field of Search ............ 415/104, 106, 107, 1, 415/14, 118; 310/90.5; 417/365, 424.1

[56] References Cited

U.S. PATENT DOCUMENTS

| 1,347,591 | 7/1920 | Röder | 415/107 |
|---|---|---|---|
| 1,499,056 | 6/1924 | Hollander | 415/104 |
| 1,936,066 | 11/1933 | Peterson | 415/104 |
| 3,105,632 | 10/1963 | Tanzberger . | |
| 5,013,987 | 5/1991 | Wakui | 310/90.5 |
| 5,104,284 | 4/1992 | Hustak, Jr. et al. | 415/107 |

FOREIGN PATENT DOCUMENTS

| 0102334 | 1/1983 | European Pat. Off. . . | |
| 3700153 | 7/1987 | Fed. Rep. of Germany | 415/107 |
| 0876247 | 10/1942 | France | 415/106 |
| 0113095 | 9/1981 | Japan | 310/90.5 |
| 0150616 | 11/1981 | Japan | 310/90.5 |
| 0065416 | 4/1982 | Japan | 310/90.5 |
| 0097916 | 6/1982 | Japan | 310/90.5 |
| 0014619 | 1/1985 | Japan | 310/90.5 |
| 0079101 | 5/1985 | Japan | 415/106 |
| 0258195 | 11/1987 | Japan . | |
| 0187395 | 7/1989 | Japan | 415/104 |
| WO-91/14853 | 7/1991 | PCT Int'l Appl. . | |
| 0469815 | 8/1975 | U.S.S.R. | 415/107 |

OTHER PUBLICATIONS

Tribology International, Apr. 1980, vol. 13, No. 2, "an Active Magnetic Bearing System," H. Habermann and G. Liard, pp. 85-90.
Patent Abstracts of Japan-Publication No. JP3078596, Publication Date: Mar. 4, 1991-M. Takaharu, et al.
Patent Abstracts of Japan-Publication No. JP1187395, Publication Date: Jul. 26, 1989-Y. Yasuyuki.

Primary Examiner—Edward K. Look
Assistant Examiner—Christopher Verdier
Attorney, Agent, or Firm—Antonelli, Terry, Stout & Kraus

[57] ABSTRACT

A turbo compressor in which a rotor having impellers is supported by a magnetic bearing is constructed such that a control valve is provided in a thrust balancing line connecting a suction line of the compressor to a balancing chamber formed outside a balancing drum provided at one end side of a rotor. The control valve serves to regulate a rate at which a gas flows through the thrust balancing line, and is adapted to be controlled in relation to a load imposed upon the magnetic thrust bearing.

5 Claims, 3 Drawing Sheets

PLUS DIRECTION ←  → MINUS DIRECTION

TURBO COMPRESSOR AND METHOD OF CONTROLLING THE SAME

BACKGROUND OF THE INVENTION

This invention relates to a turbo compressor having a rotor supported by a magnetic bearing and a method of controlling the turbo compressor, and more particularly, to a high-pressure type of single-shaft multistage centrifugal compressor.

As shown in FIG. 3, a single-shaft multi-stage centrifugal compressor includes a rotor 2 having a plurality of impellers 10 are attached thereto, with the rotor 20 and impellers 10 being incorporated in a casing 1 and, with the rotor 10 being supported by oil bearings 7. The rotor 2 is rotated by a motor to draw a gas being compressed through a nozzle 4. Driving energy is thereby applied to the gas by the impeller 10, and the gas is thereby increased in pressure and is discharged through a nozzle 5.

The pressure of the gas is higher at a compression stage closer to the rear portion of the compressor, and the interstage labyrinth diameter is smaller than the mouth labyrinth diameter. Therefore the static pressure acts on one impeller as an axial force in the direction from the discharge side to the suction side. To reduce this thrust force to a magnitude within the range of an allowable load capacity of the thrust bearing corresponding to the axial-end diameter of the rotor, a balancing drum 11 is provided at an axial end of the final-stage impeller, and a chamber 12 communicating with the suction side is formed outside the balancing drum 11.

In this type of turbo compressors using oil bearings, the friction loss of the bearings is generally several tens of kilowatts. If the above-mentioned oil bearings are replaced with non-contact type magnetic bearings, the running cost of the compressor can be reduced and the lubrication system can be maintenance-free.

As a turbo compressor using a balancing drum, a compressor disclosed in Japanese Patent Unexamined Publication No. 62-258195 is known.

The load capacity of magnetic bearings, however, is on the order of about 1/10 of that of oil bearings (ordinarily, several kg/cm$^2$ or less in terms of surface pressure), and a problem of an increase in the size of a thrust bearing portion is therefore encountered. That is, if a magnetic bearing is used, the diameter of a journal bearing portion is increased in comparison with oil bearings and the inside diameter of the thrust bearing is also increased, because the load capacity of the magnetic bearing is small. Also there is a need to increase the area of a thrust collar, i.e., the diameter of the thrust collar in comparison with oil bearings. If the thrust bearing is disposed outside of the journal bearing and if the thrust collar is large, a problem of a natural oscillation frequency of the compressor rotor in a high-order mode is reduced close to the number of revolutions in steady operation arises. If the thrust bearing is disposed inside the journal bearing, a problem of a further increase in the diameter of the shaft sealing device, a problem of the allowable peripheral speed of the shaft sealing device being exceeded, and a problem of difficulty in constructing the compressor are encountered.

A thrust force acting on the compressor shaft is calculated from a static pressure on an impeller portion, fluid force caused by a gas flow, leaks through gaps, and so on. However, the thrust force is changed due to the difference between design conditions and operating conditions or by a change in these conditions or a change with time (such as wear of labyrinth seals). Therefore the reliability of the bearing system cannot be satisfactorily high unless a thrust bearing having a sufficiently large load capacity is selected. For this reason, a large thrust bearing having such a large capacity is required in the conventional compressors.

SUMMARY OF THE INVENTION

An object of the present invention is to provide a turbo compressor having a magnetic thrust bearing reduced in size by being arranged so that a thrust force acting on the magnetic thrust bearing is constantly small and stable.

Another object of the present invention is to provide a turbo compressor in which only a small, generally constant thrust force can act on a magnetic thrust bearing even if the thrust force acting on the rotor is changed or varied to a large extent due to the difference between design conditions and operating conditions of the compressor or by a change in these conditions or a change with time (such as wear of labyrinths).

To achieve the above objects, according to the present invention, there is provided a turbo compressor comprising a magnetic bearing for supporting a rotor having an impeller against a thrust force acting on the rotor, a balancing drum provided at one end side of the rotor, a thrust balancing line which connects a chamber on one side of the balancing drum to a suction line of the compressor to control a thrust force acting on the balancing drum, and a control valve provided in the thrust balancing line for controlling a flow rate of the gas flowing through this line. A rotor position detection sensor detects an axial displacement of the rotor, with means being provided for controlling the magnetic bearing on the basis of signals from the rotor position detection sensor, and with means for controlling an opening degree of the control valve so that a load on the magnetic bearing is reduced.

The arrangement of a turbo compressor having these features may be such that the outside diameter of the balancing drum is greater than the inside diameter of a mouth seal provided on the suction side of the impeller.

According to the present invention, there is provided a turbo compressor having a thrust bearing for supporting a rotor having at least one impeller against a thrust force acting on the rotor, a balancing drum provided at one end side of the rotor, a balancing chamber formed at an outer position in the compressor relative to the balancing drum, a thrust balancing line connecting the balancing chamber to a suction line of the compressor, and a control valve provided in the thrust balancing line and operable to change the rate at which a gas flows through this line to control the pressure in the balancing chamber so that a thrust force acting on the balancing drum is regulated. A rotor position detection sensor detects an axial displacement of the rotor, and means are provided for controlling the opening of the control valve on the basis of a signal from the rotor position detection sensor so that the position of the rotor substantially corresponds to a reference position.

According to the present invention, there is provided a turbo compressor comprising a magnetic thrust bearing for supporting a rotor having at least one impeller against a thrust force acting on the rotor, a balancing drum provided at one end side of the rotor, a balancing chamber formed at an outer position in the compressor relative to the balancing drum, a thrust balancing line connecting the balancing chamber to a suction line of the compressor, and a control valve provided in the thrust balancing line and operable to change the rate at which a gas flows through this line to control the pressure in the balancing chamber so that a thrust force acting on the balancing drum is regulated. An opening of the control valve is controlled so that a load upon the magnetic thrust bearing is reduced.

According to the present invention, there is provided a turbo compressor having a thrust bearing, a balancing drum, a balancing chamber, and a thrust balancing line which connects the balancing chamber to a suction line of the compressor, wherein a rate at which a gas flows through the thrust balancing line is regulated to control the pressure in the balancing chamber so that a thrust force acting on the balancing drum is regulated.

According to the present invention, there is provided a turbo compressor comprising a magnetic thrust bearing for supporting a rotor having at least one impeller against a thrust force acting on the rotor, a balancing drum provided at one end side of the rotor, a balancing chamber formed at an outer position in the compressor relative to the balancing drum, a thrust balancing line connecting the balancing chamber to a suction line of the compressor, and a control valve provided in the thrust balancing line and operable to regulate to the rate at which a gas flows through the this line to control the pressure in the balancing chamber so that a thrust force acting on the balancing drum is regulated. A rotor position detection sensor detects an axial displacement of the rotor, and means for controlling the magnetic thrust bearing on the basis of a signal from the rotor position detection sensor. The magnetic thrust bearing includes a pair of thrust bearing portions provided on the opposite sides of a thrust collar provided on the rotor, and the opening of the control valve is controlled so that the load upon one of the thrust bearing portions at an inner position in the compressor is slightly greater than the load upon the other thrust bearing portion at an outer position in the compressor.

According to the present invention, there is provided a turbo compressor comprising a rotor having a plurality of impellers arranged in the axial direction, a magnetic thrust bearing for supporting the rotor against a thrust force acting on the rotor, a balancing drum provided at one end side of the rotor, a balancing chamber formed at an outer position in the compressor relative to the balancing drum, a thrust balancing line connecting the balancing chamber to a suction line of the compressor, and a control valve provided in the thrust balancing line and operable to regulate the rate at which a gas flows through this line to control the pressure in the balancing chamber so that a thrust force acting on the balancing drum is regulated. A rotor position detection sensor detects an axial displacement of the rotor, with comparison means for comparing a signal from the rotor position detection sensor with a reference position signal. Signal processing means converts a deviation signal from the comparison means into a control signal for controlling the magnetic thrust bearing, and amplification means for amplifying the control signal from the signal processing means into a control current for producing a desired magnetic force in the magnetic thrust bearing. The magnetic thrust bearing having a pair of thrust bearing portions provided on the opposite sides of a thrust collar provided on the rotor, and the opening of the control valve is controlled so that the control current for one of the thrust bearing portions at an inner position in the compressor is greater than the control current for the outer thrust bearing portion at an outer position in the compressor.

According to the present invention, there is provided a turbo compressor comprising a magnetic thrust bearing for supporting a rotor having at least one impeller against a thrust force acting on the rotor, a balancing drum provided at one end side of the rotor, a balancing chamber formed at an outer position in the compressor relative to the balancing drum, a thrust balancing line connecting the balancing chamber to a suction line of the compressor, and a control valve provided in the thrust balancing line and operable to regulate the rate at which a gas flows through this line to control the pressure in the balancing chamber so that a thrust force acting on the balancing drum is regulated. A rotor position detection sensor detects an axial displacement of the rotor, with means for controlling the magnetic thrust bearing on the basis of a signal from the rotor position detection sensor, and means for controlling the opening of the control valve so that a load upon the magnetic bearing is reduced.

According to the present invention, there is provided a turbo compressor comprising a magnetic thrust bearing having a pair of thrust bearing portions disposed at opposite ends of a thrust collar provided on a rotor having at least one impeller, the thrust bearing portions being capable of supporting the rotor against a thrust force acting on the rotor, a balancing drum provided at one end side of the rotor, a balancing chamber formed at an outer position in the compressor relative to the balancing drum, a thrust balancing line connecting the balancing chamber to a suction line of the compressor, and a control valve provided in the thrust balancing line and operable to regulate the rate at which a gas flows through this line to control the pressure in the balancing chamber so that a thrust force acting on the balancing drum is regulated. A rotor position detection sensor detects an axial displacement of the rotor, and means for controlling the magnetic thrust bearing on the basis of a signal from the rotor position detection sensor. An outside diameter of the balancing drum is selected so that, under a condition in which the control valve is partially open, the control current for one of the thrust bearing portions of the magnetic thrust bearing at an inner position in the compressor is greater than the control current for the other thrust bearing portion at an outer position in the compressor and is stabilized.

According to the present invention, there is provided a method of controlling a turbo compressor having a thrust bearing for supporting a rotor having at least one impeller against a thrust force acting on the rotor, a balancing drum provided at one end side of the rotor, a balancing chamber formed at an outer position in the compressor relative to the balancing drum, and a thrust balancing line connecting the balancing chamber to a suction line of the compressor. A resistance of the thrust balancing line to a gas flow is controlled dependence upon the thrust force acting on the rotor so that the thrust force acting on the rotor is maintained in a predetermined range.

According to the present invention, there is provided a method of controlling a turbo compressor having a magnetic thrust bearing for supporting a rotor having at least one impeller against a thrust force acting on the rotor, a balancing drum provided at one end side of the rotor, a balancing chamber formed at an outer position in the compressor relative to the balancing drum, a thrust balancing line connecting the balancing chamber to a suction line of the compressor, wherein the rate at which a gas flows through the thrust balancing line is controlled in relation to a load imposed upon the magnetic thrust bearing so that the thrust force acting on the rotor is maintained in a predetermined range.

In accordance with the present invention, to limit a thrust force acting on the magnetic thrust bearing to a small magnitude with stability, the chamber on the outside of the balancing drum is connected to a suction side of the compressor by a thrust balancing line, a control valve for regulating the pressure in the chamber is provided in the thrust balancing line, and the opening of this control valve is controlled so that a load upon the magnetic bearing is reduced.

For example, in a case where a thrust bearing is provided at an axial end on the suction side, a thrust force acts in the direction from the discharge side to the suction side in order to prevent a thrust collar from coming off (which direction is hereinafter referred to as a positive thrust direction). For this effect, the compressor is arranged so that, when the valve is slightly throttled from the fully opened state, that is, when the pressure in the chamber on the outside of the balancing drum is slightly higher than the suction pressure, an appropriate positive thrust force acts on the magnetic bearing. In the case of a magnetic bearing, to set this positive thrust force to a value on the order of about 1/10 of that in the case of oil bearings, the force acting actually on the magnetic thrust bearing is detected, and the opening of the valve is adjusted in accordance with the detected value. That is, the opening of the valve is controlled so that the difference between electric currents for energization of a load-side (negative-thrust-side) bearing portion and an anti-load-side (negative-thrust side) bearing portion of the magnetic thrust bearing is equal to a predetermined value.

This thrust force regulating apparatus can function not only during steady operation of the compressor but also in a situation where operating conditions are changed or during transient operation. It is thereby possible to obtain a suitable small positive thrust force with stability. The thrust force in the compressor of the present invention can therefore be reduced in comparison with the conventional compressors, so that the size of the magnetic thrust bearing can be reduced, and the load capacity can be sufficiently increased if the size of the magnetic thrust bearing is not changed.

If the diameter of the balancing drum is greater than a diameter of a labyrinth at a mouth of the impeller mouth labyrinth diameter, a thrust force in the negative thrust direction can be increased to an extent corresponding to the difference between these diameters. The degree of freedom of controlling the thrust force in the positive thrust direction can be thereby increased, so that this thrust force can be easily adjusted to a small magnitude.

These and other objects, features and advantages of the present invention will become apparent from the following description of an embodiment of the present invention taken in conjunction with the accompanying drawings.

DESCRIPTION OF THE PREFERRED EMBODIMENT

Figure 1:
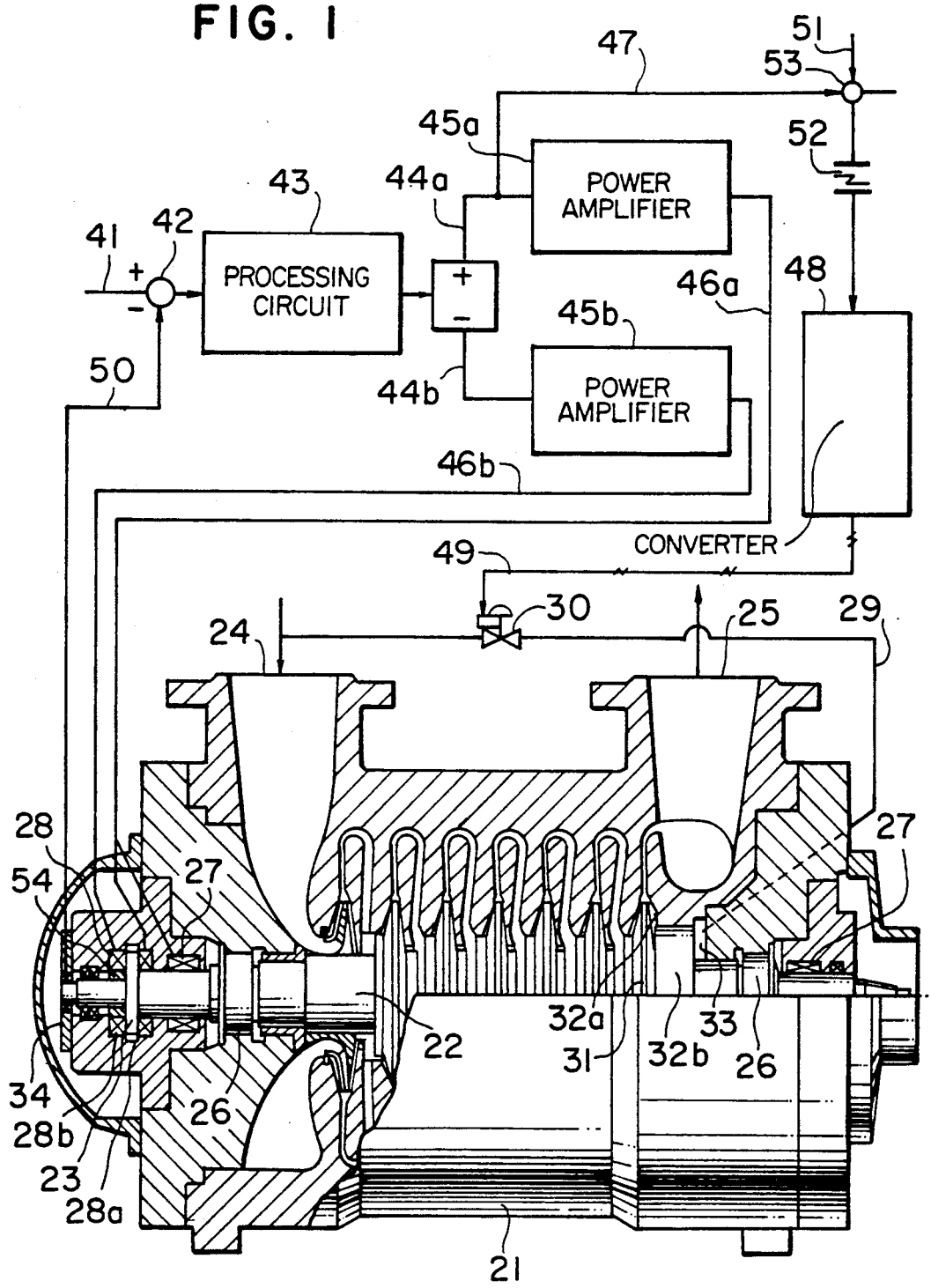
FIG. 1 is a schematic longitudinal cross-sectional view diagram of a turbo compressor in accordance with the present invention.

Referring to FIG. 1, a turbo compressor of the present invention includes a rotor 22 to which a plurality of impellers 31 are attached with the rotor being accommodated in a casing 21 and supported by journal magnetic bearings 27. A gas to be compressed enters through a suction nozzle 24, is compressed successively by the impellers 31, and flows out of a discharge nozzle 25. Because the pressure of the compressed gas is increased from the suction nozzle to the discharge nozzle, an axial thrust force is applied to the rotor 22 in the direction from the discharge side to the suction side. A magnetic thrust bearing 28 is therefore incorporated in this compressor. Further, a balance labyrinth 32a and a balancing drum 32b are provided outside a final-stage impeller, and a chamber (balancing chamber) 33 communicating with the suction nozzle through a control valve 30 is formed outside the balancing drum 32b.

It is necessary for the magnetic thrust bearing 28 to have a reaction force corresponding to the above-mentioned thrust force. The position of the rotor in the axial direction is detected by a rotor axial position dectorior sensor 34, with a signal 50 from this sensor and a reference position signal 41 being compared by a comparator 42, and a deviation of the former from the reference signal 41 is converted into a control signal 44 (44a, 44b) by a signal processing circuit 43. The control signal 44 is amplified by power amplifiers 45a and 45b to produce control currents 46a and 46b. These control currents flow through the magnetic thrust bearing 28 to generate a magnetic force acting as a thrust force. In the example shown in FIG. 1, since each impeller, except for the final-stage impeller, receives a thrust force applied in the direction from the discharge side to the suction side (positive thrust force), the rotor as a whole ordinarily has a thrust force in the direction from the discharge side to the suction side. Accordingly, a magnetic force generated for an inner thrust bearing portion 28a (i.e., suction force) is greater than a magnetic force generated for an outer thrust bearing portion 28b. That is, the thrust bearing portion control currents 46a and 46b are controlled so that the control current 46a is greater than the control current 46b. The control system is therefore arranged in such a manner that the thrust bearing portion control signal 44a is extracted as a thrust bearing portion control signal 47 and is compared with a reference signal 51 by a comparator 53, and a control signal is produced in accordance with a deviation from the reference signal and is converted into a control value 49 by a converter 48 to be supplied to a control valve 30 such as an air control valve. The opening of the control valve 30 is thereby controlled according to the change in the thrust force. An dead band 52 is provided in the control line to the control valve 30 to correct the opening of the control valve only when the deviation signal becomes greater than a certain level, thereby preventing hunting.

In this embodiment, the output from the rotor axial position detection sensor 34 is set to 0 only when the rotor is at a normal position. If the rotor is displaced in the direction from the discharge side to the suction side (plus direction), the output from the sensor 34 is set to a plus value in accordance with the extent of displacement. If the rotor is displaced in the direction from the suction side to the discharge side (minus direction), the output from the sensor 34 is set to a minus value in accordance with the extent of displacement. The values set as reference signals 41 and 51 are therefore 0.

Figure 2:
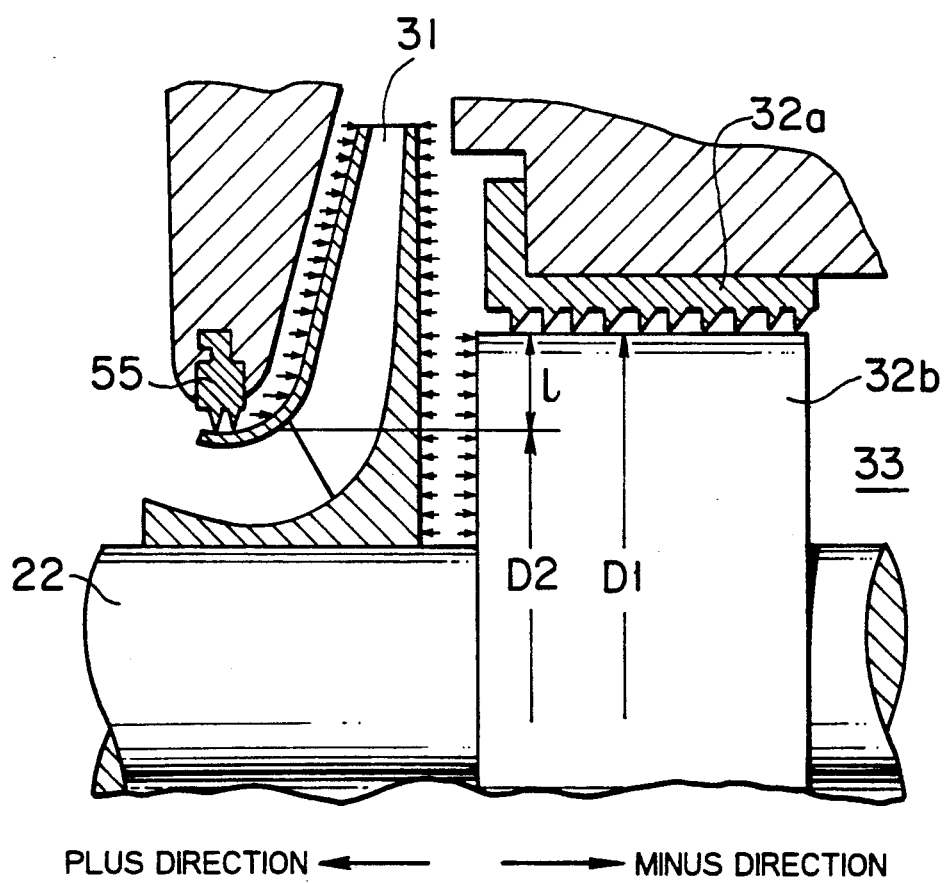
FIG. 2 is a cross-sectional view of a portion of the compressor shown in FIG. 1, showing the function of a balancing drum.
Figure 3:
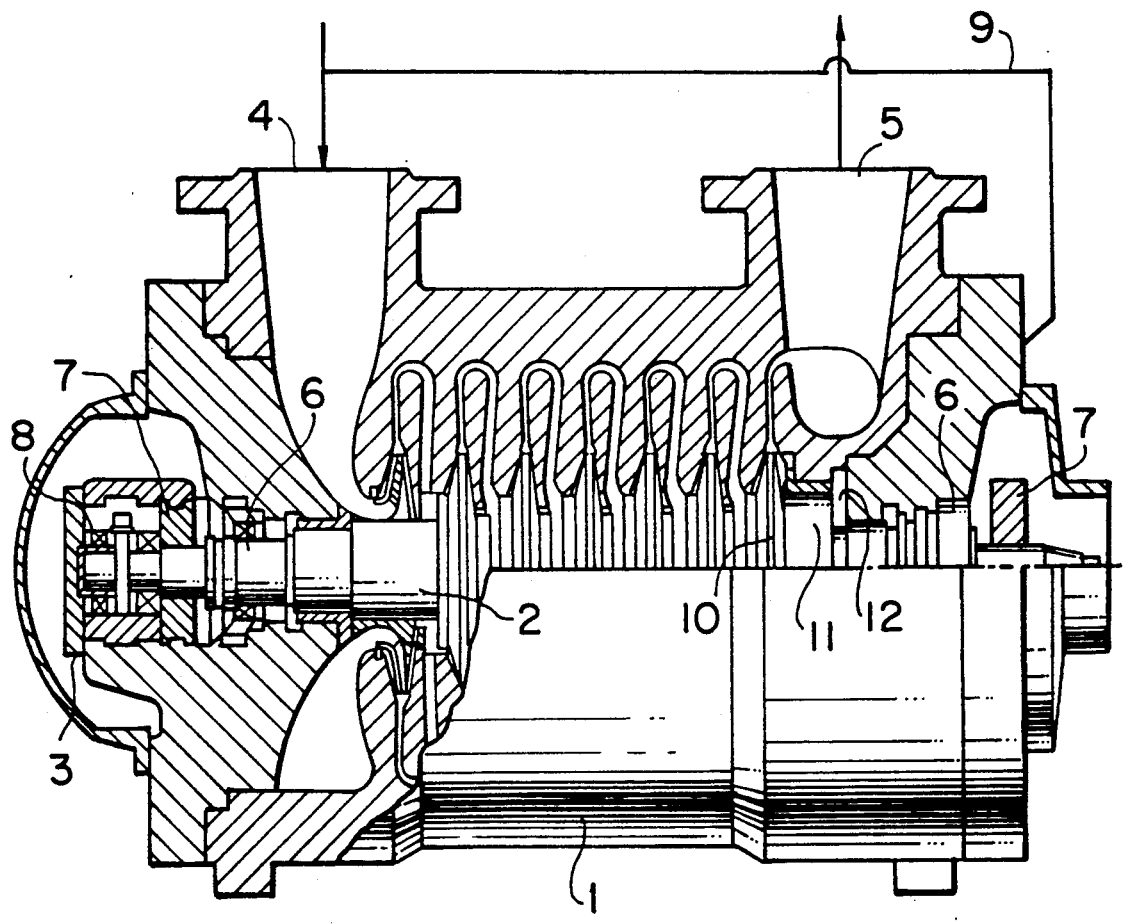
FIG. 3 is a partially fragmentary front view of a conventional turbo compressor.

In this embodiment, as shown in FIG. 2, the outside diameter D1 of the balancing drum 32b located outside the final-stage impeller is greater than the inside diameter D2 of the mouth labyrinth 55 on the final-stage impeller. Also, the balancing chamber 33 outside the balancing drum communicates with a compressor suction portion. It is therefore possible to apply a large thrust force to the balancing drum 32b in the minus direction (in the direction from the suction side to the discharge side). That is, as indicated by a plurality of arrows in FIG. 2, a thrust force acts on the rotor (the final-stage impeller 31 and the balancing drum 32b). Accordingly, as is apparent from FIG. 2, a thrust force in the minus direction corresponding to a difference l by which the outside diameter of the balancing drum is greater than the inside diameter of the mouth labyrinth is produced between the final-stage impeller and the balancing drum. This thrust force in the minus direction acts oppositely to the thrust force acting on the impeller at each stage in the plus direction (the direction to the suction side), and these forces can cancel out with each other. In this embodiment, the outside diameter D1 of the balancing drum 32b is selected so that when the control valve 30 is fully open, the thrust force applied to the entire rotor is a very small force in the plus direction or a force in the minus direction. As the control valve is throttled from this state, the pressure in the balancing chamber is increased, so that the force in the minus direction is reduced while the thrust force in the plus direction is increased. Preferably, the diameter D1 of the balancing drum 32b should be determined so that the thrust bearing position control current 46a is greater than the thrust bearing portion control current 46b and is stably maintained when the control valve 30 is partially open. The control can be thereby performed so that a certain thrust force in the direction to the suction side (plus direction) can be applied to the rotor during normal operation. It is thereby possible to stabilize the rotor and to prevent a thrust collar 23, a nut 54 and other members from coming off.

During steady operation of the thus-constructed turbo compressor, if the rotor thrust force is changed by surging or a change in an operating condition such as suction pressure or discharge pressure, the turbo compressor in accordance with this embodiment operates in the following manner.

A situation where the thrust force in the direction to the suction side (plus direction) is increased by a change in the operating conditions for some reason will be discussed below. If the axial position of the rotor is shifted in the direction to the suction side, a detected signal 50 and the reference signal 41 is compared with each other, and the inner thrust bearing portion control signal 44a is increased in accordance with the deviation from the reference signal. The inner thrust bearing portion control current 46a is thereby increased and the magnetic force (attraction force) of the inner thrust bearing is increased, so that the rotor is returned to the original position. On the other hand, when the inner thrust bearing portion control signal 44a is increased, it is compared with the reference signal 51, and the control valve 30 is operated in accordance with the deviation from the reference signal 51 (in the opening direction in this case). When the control valve 30 is opened, the pressure in the balancing chamber 33 is reduced and the force acting on the balancing drum 32b in the direction of the discharge side (minus direction) is increased, so that the thrust force acting on the entire rotor in the direction of the suction side is reduced.

In accordance with this embodiment, this control operation is consecutively repeated to prevent occurrence of a large thrust force acting on the thrust bearing even if the operating conditions are changed. Thus, the thrust force produced to act on the rotor can be controlled through the steady and transient operations so as to be prevented from being excessively increased, whereby the size of magnetic thrust bearing 28 can be reduced. If the size of the magnetic thrust bearing can be reduced, a reduction in the rotating mass outside the journal magnetic bearing 27 as well as a reduction in the axial length of the shaft can be achieved, thereby facilitating supporting a turbo compressor by means of a magnetic thrust bearing, which turbo compressor is conventionally supported by oil bearings. A complete magnetic bearing system can be thereby achieved to realize an oil-free design and, hence, an economical turbo compressor reduced in running cost, maintenance cost or the like.

According to the present invention, in a turbo compressor using a magnetic thrust bearing, the thrust force acting on the thrust magnetic bearing can be constantly reduced with stability, and the size of the magnetic thrust bearing can be reduced. As a result, the present invention makes it easy to obtain an economical turbo compressor using a magnetic thrust bearing support.

The present invention also ensures that only a small, generally constant thrust force can act on the magnetic thrust bearing even if the rotor thrust force is changed to a large extent due to the difference between design conditions and operating conditions of the compressor or by a change in these conditions or a change with time (such as wear of labyrinths). It is therefore possible to obtain a turbo compressor having smaller bearing portions having improved reliability.

What is claimed is:

1. A turbo compressor comprising:
   a rotor having a plurality of impellers arranged in an axial direction;
   a magnetic thrust bearing for supporting said rotor against a thrust force acting on said rotor, said magnetic thrust bearing including a pair of thrust bearing portions provided on opposite sides of a thrust collar provided on the rotor;
   a balancing drum provided at one end side of said rotor;
   a balancing chamber formed at an outer position of the compressor relative to said balancing drum;
   a thrust balancing line connecting said balancing chamber to a suction line of the compressor;
   a control valve provided in said thrust balancing line and operable to regulate a rate at which gas flows through said thrust balancing line to control a pressure in said balancing chamber so that a thrust force acting on said balancing drum is regulated, an opening of said control valve is controlled so that a control current for one of the thrust bearing portions at an inner position in the compressor is greater than a control current for the other thrust bearing portion at an outer position in the compressor;

a rotor position detection sensor for detecting an axial displacement of said rotor;

comparison means for comparing a signal from said rotor position detection sensor with a reference position signal;

signal processing means for converting a deviation signal form said comparison means into a control signal for controlling said magnetic thrust bearing;

amplification means for amplifying the control signal form said signal processing means into a control current for producing a desired magnetic force in said magnetic thrust bearing; and further comparison means for comparing the control signal for the magnetic thrust bearing portion at the inner position in the compressor with a reference inner magnetic thrust bearing portion signal, the opening of said control valve being controlled on the basis of the deviation signal from said further comparison means.

2. A turbo compressor according to claim 1, further comprising a dead band for transmitting a control valve opening control signal to means for controlling said control valve only when the deviation signal from said comparison means becomes greater than a predetermined value.

3. A turbo compressor according to claim 2, wherein an outside diameter of said balancing drum is selected so that, under a condition in which said control valve is partially open, the control current for one of the thrust bearing portions of said magnetic thrust bearing at the inner position in the compressor is greater than the control current for the other thrust bearing portion at the outer position in the compressor and is stabilized.

4. A method of controlling turbo compressor having a rotor with a plurality of impellers arranged in an axial direction of the rotor, a magnetic thrust bearing for supporting said rotor against a thrust force acting on said rotor, said magnetic thrust bearing including a pair of thrust bearing portions provided on opposite sides of a thrust collar provided on the rotor, a balancing drum provided at one end side of said rotor, a balancing chamber formed at an outer position in the compressor relative to said balancing drum, a thrust balancing line connecting said balancing chamber to a suction line of the compressor, a control valve provided in the thrust balancing line for regulating a rate at which a gas flows through the thrust balancing line, a rotor position detection sensor detecting an axial displacement of the rotor, a first and second comparison means for comparing signals from the sensor and at least one of the magnetic thrust bearing portions, signal processing means, and amplification means, the method comprising the steps of controlling an opening of the control valve so that a control current for one of the thrust bearing portions at an inner position of the compressor is greater than the control current for the other thrust bearing at an outer portion of the compressor, and comparing a control signal for the magnetic thrust bearing portion at the inner position in the compressor with a reference inner magnetic thrust bearing portion signal, with the opening of the control valve being controlled in dependence upon a deviation signal from one of the comparison means.

5. A method of controlling a turbo compressor according to claim 4, wherein a control valve opening control signal is provided only when the deviation signal from one of the comparison means become greater than a predetermined value.

* * * * *